United States Patent
Chen

(10) Patent No.: US 7,219,583 B1
(45) Date of Patent: May 22, 2007

(54) PNEUMATIC SCREWDRIVER HAVING AN ADJUSTABLE CLOCKWISE TORQUE AND A MAXIMUM COUNTERCLOCKWISE TORQUE

(75) Inventor: Lung-Pao Chen, Hsinchu County (TW)

(73) Assignee: Sunmatch Industrial Co., Ltd., Hsinchu County (TW)

( * ) Notice: Subject to any disclaimer, the term of this patent is extended or adjusted under 35 U.S.C. 154(b) by 0 days.

(21) Appl. No.: 11/315,363

(22) Filed: Dec. 23, 2005

(51) Int. Cl.
*B25B 23/157* (2006.01)
*F16D 43/208* (2006.01)
*B25B 23/14* (2006.01)

(52) U.S. Cl. .................. 81/467; 81/473; 192/54.52
(58) Field of Classification Search ............... 81/467, 81/473–476; 192/54.1, 54.52, 56.33, 56.43, 192/56.54, 56.57, 56.62
See application file for complete search history.

(56) References Cited

U.S. PATENT DOCUMENTS

| | | | |
|---|---|---|---|
| 2,820,381 A * | 1/1958 | White | 81/474 |
| 3,020,789 A * | 2/1962 | Etzkorn | 81/474 |
| 4,599,019 A * | 7/1986 | Ueberall | 408/139 |
| 5,437,524 A * | 8/1995 | Huang | 408/139 |
| 2006/0278051 A1* | 12/2006 | Gauthier et al. | 81/473 |

FOREIGN PATENT DOCUMENTS

| JP | 02256470 A | * 10/1990 |
|---|---|---|
| TW | 167986 | 9/1991 |

* cited by examiner

*Primary Examiner*—David B. Thomas
(74) *Attorney, Agent, or Firm*—Birch, Stewart, Kolasch & Birch, LLP

(57) ABSTRACT

A pneumatic screwdriver having an adjustable clockwise torque and a maximum counterclockwise torque includes a transmission seat having at least one steel ball hole and a through hole. The steel ball hole installs a steel ball and has a clockwise rotating area and a counterclockwise rotating area. With a first leaning portion perpendicular to the clockwise rotating area, the steel ball is separated from the steel ball groove easily, so that the transmission seat, steel ball, and steel ball groove slide with each other, and the compressing strength of the torque spring is adjusted to change the clockwise torque. With a second leaning portion disposed with an inclination on the counterclockwise rotating area, the steel ball is stopped from being separated from the steel ball groove, thus the steel ball cannot slide with the transmission seat, and a maximum torque can be outputted directly when the screwdriver is turned counterclockwise.

10 Claims, 7 Drawing Sheets

PNEUMATIC SCREWDRIVER HAVING AN ADJUSTABLE CLOCKWISE TORQUE AND A MAXIMUM COUNTERCLOCKWISE TORQUE

FIELD OF THE INVENTION

The present invention relates to a pneumatic screwdriver, and more particularly to a pneumatic screwdriver having an adjustable clockwise torque and a maximum counterclockwise torque.

BACKGROUND OF THE INVENTION

Pneumatic screwdriver is a tool for manually securing or loosening a screw, and a traditional pneumatic screwdriver as disclosed in R.O.C. Pat. Publication No. 167986 includes a pneumatic motor for driving a power axle to push a transmission seat, and the transmission seat includes a plurality of steel ball holes for passing a cam rod, and the cam rod has a steel ball seat, and the steel ball seat includes a plurality of steel ball grooves, and a steel ball is placed between the steel ball groove and the steel ball hole. A torque spring presses on the transmission seat and the steel ball, so that the transmission seat and the cam rod form a transmitting relation, and the cam rod at its end portion has a hexagonal hole for installing various different disassembling tools such as a slotted screwdriver or a Philips screwdriver. With the transmitting relation, users can enjoy the tremendous convenience brought by the pneumatic tool. The detailed structure of a transmission seat in the foregoing prior art pneumatic screwdriver as shown in FIGS. 1A and 1B includes a through hole 11, and the through hole 11 at its periphery has a plurality of steel ball holes 12, each for installing a steel ball 13, and the sidewall of the steel ball hole 12 has leaning portions 141, 142. If the pneumatic screwdriver is turned clockwise or counterclockwise, the steel balls 13 press the leaning portions 141, 142. If a user operates the pneumatic screwdriver to secure or loosen a screw, the rotating torque drives the cam rod to produce a reacting force. If the reacting force is greater than the pressing force of a torque spring, then the steel ball will push the torque spring, and the transmission seat 10, steel ball 13, and steel ball groove will produce a continuous sliding action. Now, the pneumatic screwdriver reaches a predetermined torque, so that the steel ball seat, transmission seat 10, and steel ball 13 slide with each other to output a predetermined torque instead of applying a larger torque. Since the prior art leaning portions 141, 142 are parallel with each other, therefore after the steel ball 13 regardless of being turned clockwise or counterclockwise reaches a specific torque, the steel ball will be separated from the steel ball groove, so that the torques for securing and loosening a screw are consistent. If it is necessary to loosen a larger screw or secure a tighter screw, the pneumatic screwdriver must be taken apart and a tool (such as a wrench) must be used to tighten the torque spring to increase the torque of the pneumatic screwdriver, and such procedure wastes time and efforts. Furthermore, users have to repeat the abovementioned operating procedure if the torque of the pneumatic screwdriver is not sufficiently adjusted, and thus causing tremendous inconvenience to users.

SUMMARY OF THE INVENTION

The primary objective of the present invention is to overcome the foregoing shortcomings and meet the requirements for a convenient and efficient operation by providing a pneumatic screwdriver having an adjustable clockwise torque and a maximum counterclockwise torque, so that the torque can be adjusted for a clockwise rotation, and the steel ball will not be separated from the steel ball groove in a counterclockwise rotation, so as to produce a maximum counterclockwise torque.

To achieve the foregoing objectives, a pneumatic screwdriver of the invention comprises a body, and the body has a pneumatic motor installed therein, and the pneumatic motor includes a power axle for outputting motive power. The power axle drives a transmission seat, and the transmission seat has a through hole, and the through hole at its periphery has at least one steel ball hole, and the steel ball hole forms a clockwise rotating area and a counterclockwise rotating area. The sidewall of the clockwise rotating area has a first leaning portion, and the sidewall of the counterclockwise rotating area has a second leaning portion inclined at an angle and corresponding to the first leaning portion. A cam rod passes through the through hole, and a resilient device is disposed at the through hole for pressing the transmission seat. The cam rod has a hexagonal hole at an end and a steel ball seat corresponding to the transmission seat at the other end. The steel ball seat includes an arc groove disposed thereon, and the arc groove includes at least one steel ball groove corresponding to the steel ball hole. The steel ball groove includes a steel ball and the steel ball hole for defining a link relation for the cam rod and the transmission seat, so that when the power axle is rotated clockwise, the steel ball presses on the first leaning portion until the securing reacting force of the cam rod is greater than the pressing force of the torque spring, and thus the steel ball seat, transmission seat, and steel ball slide with each other, and a predetermined torque is outputted instead of applying a larger torque. When the power axle is rotated counterclockwise, the steel ball presses on the second leaning portion, and the inclination of the second leaning portion stops the steel ball from being separated from the steel ball groove, so as to output a maximum torque directly when the power axle is rotated counterclockwise.

DETAILED DESCRIPTION OF THE PREFERRED EMBODIMENTS

The present invention will now be described in more detail hereinafter with reference to the accompanying drawings as follows.

The present invention discusses a pneumatic screwdriver having an adjustable clockwise torque and a maximum counterclockwise torque. To fully understand the present invention, a detailed description of the structural components is given as follows. Obviously, the practice of the present invention is not limited to the special details of the pneumatic screwdriver, and the persons skilled in the art can make modifications to these special details. On the other hand, the well-known prior art components will not be described here to avoid unnecessary limitations to the present invention. A preferred embodiment of the present invention will be described here. However, the detailed description of the invention also can be applied extensively to other preferred embodiments, and is not intended to limit the scope of the present invention. The present invention will now be described in more detail hereinafter with reference to the accompanying drawings that show various embodiments of the invention.

Figure 1A:
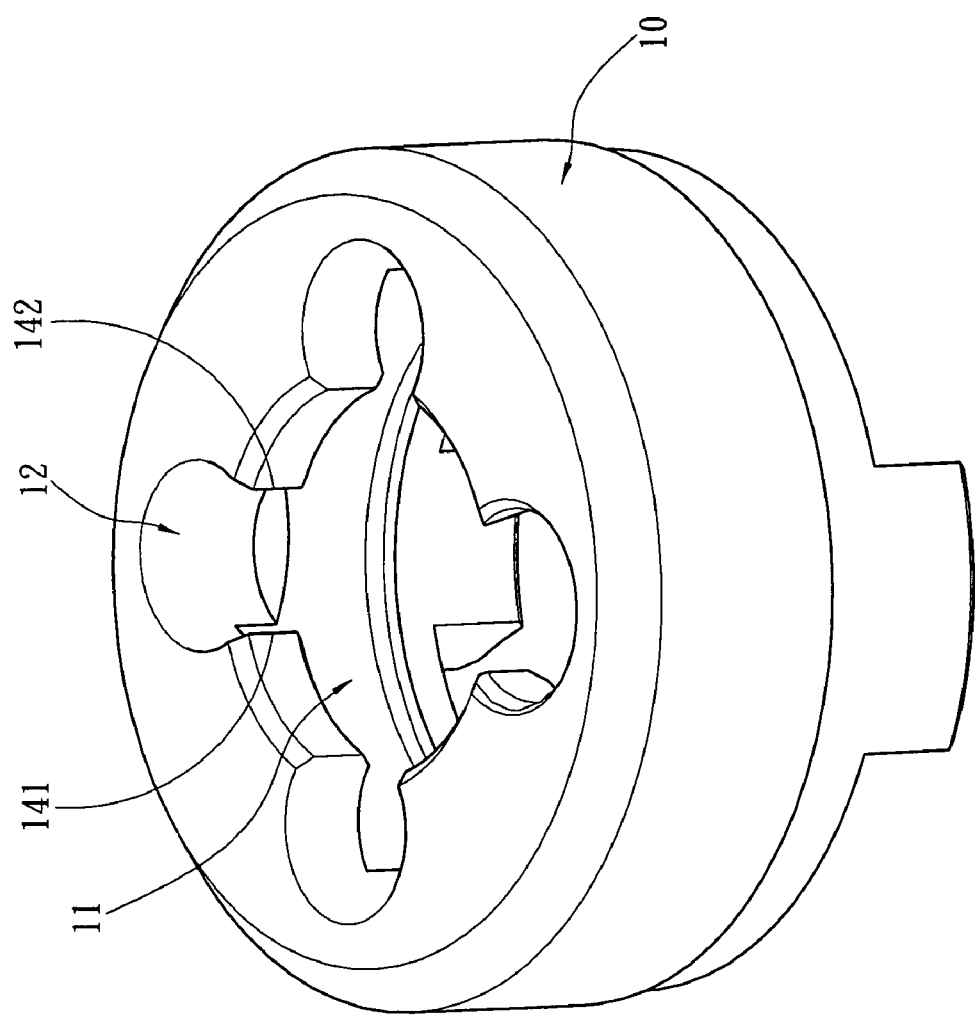
FIG. 1A is a perspective view of a prior art.
Figure 1B:
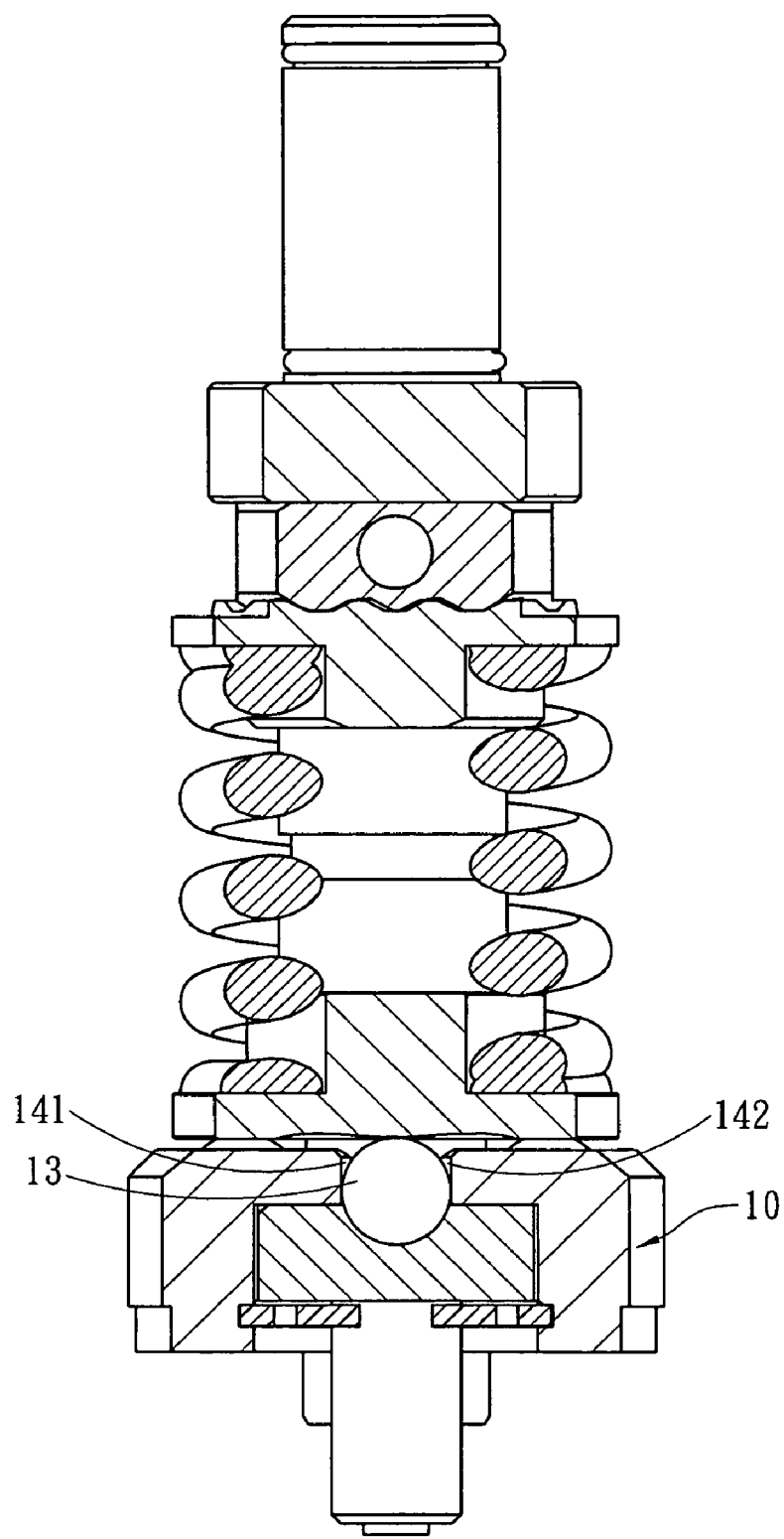
FIG. 1B is a cross-sectional view of a prior art.
Figure 2:
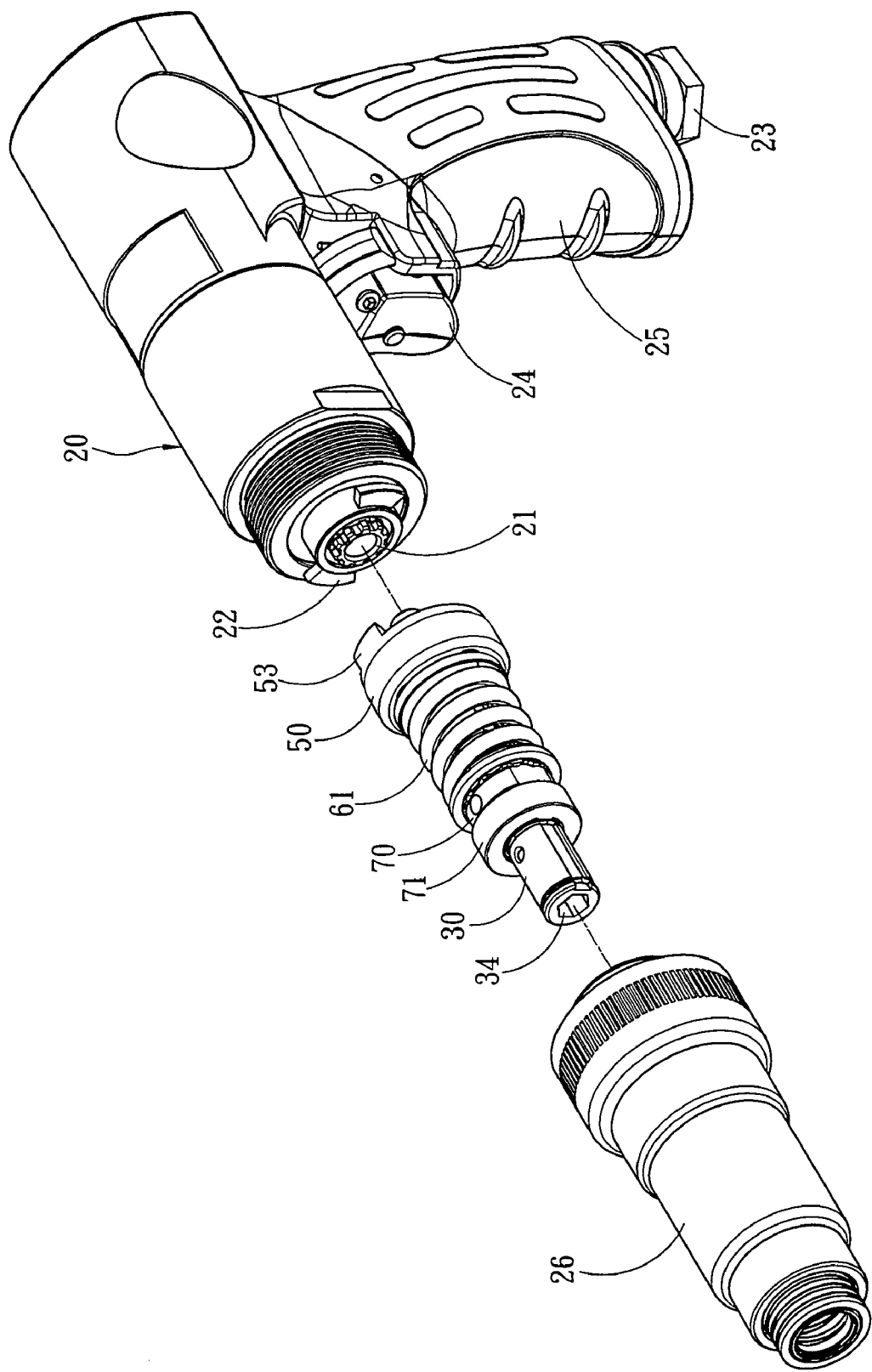
FIG. 2 is a perspective view of the present invention.
Figure 3:
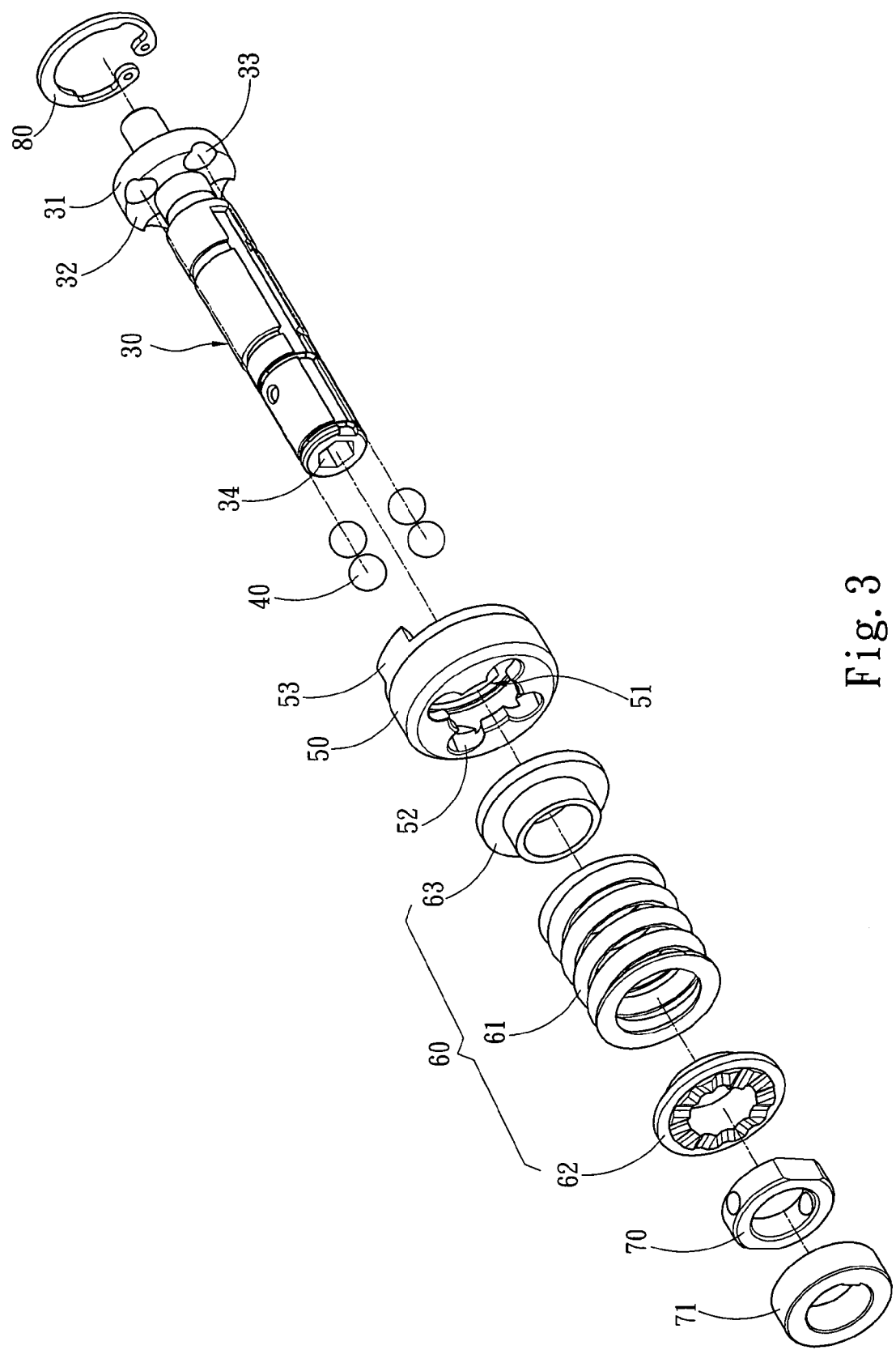
FIG. 3 is an exploded view of a portion of the structure of the present invention.
Figure 4A:
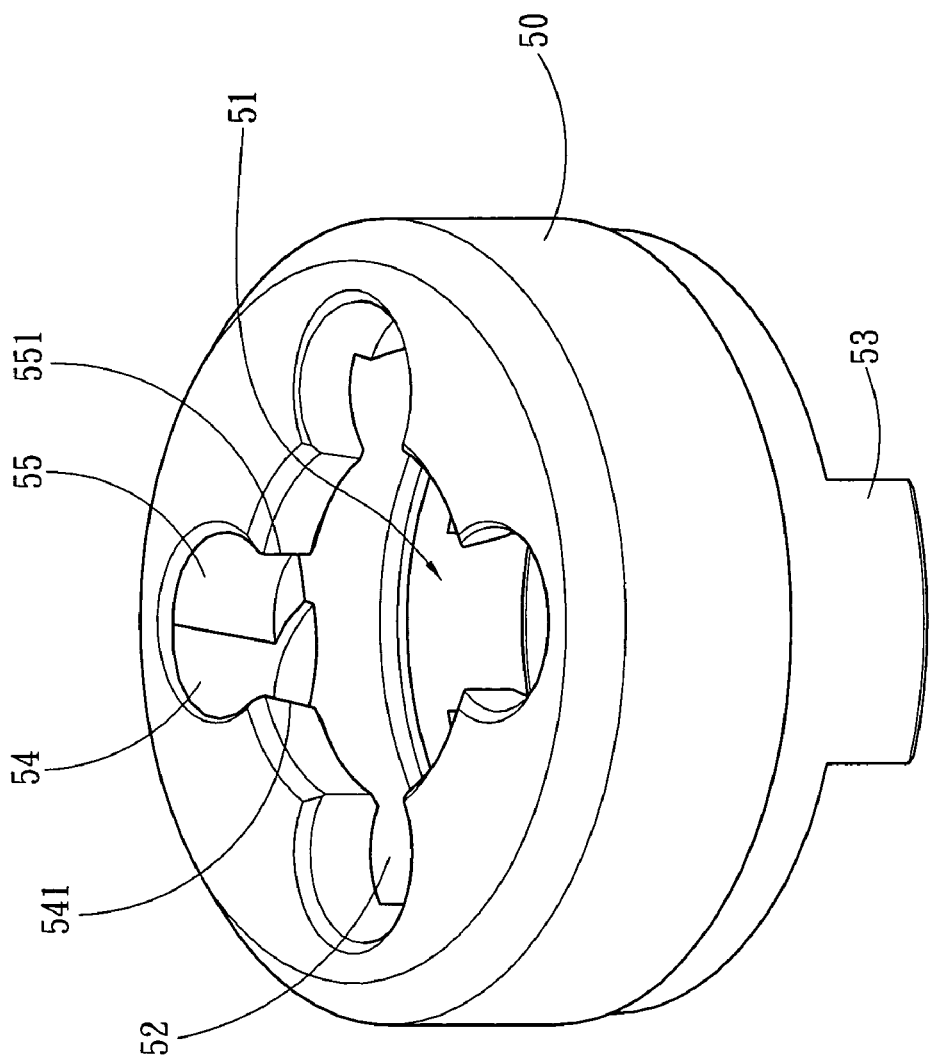
FIG. 4A is a perspective view of a transmission seat of the present invention.
Figure 4B:
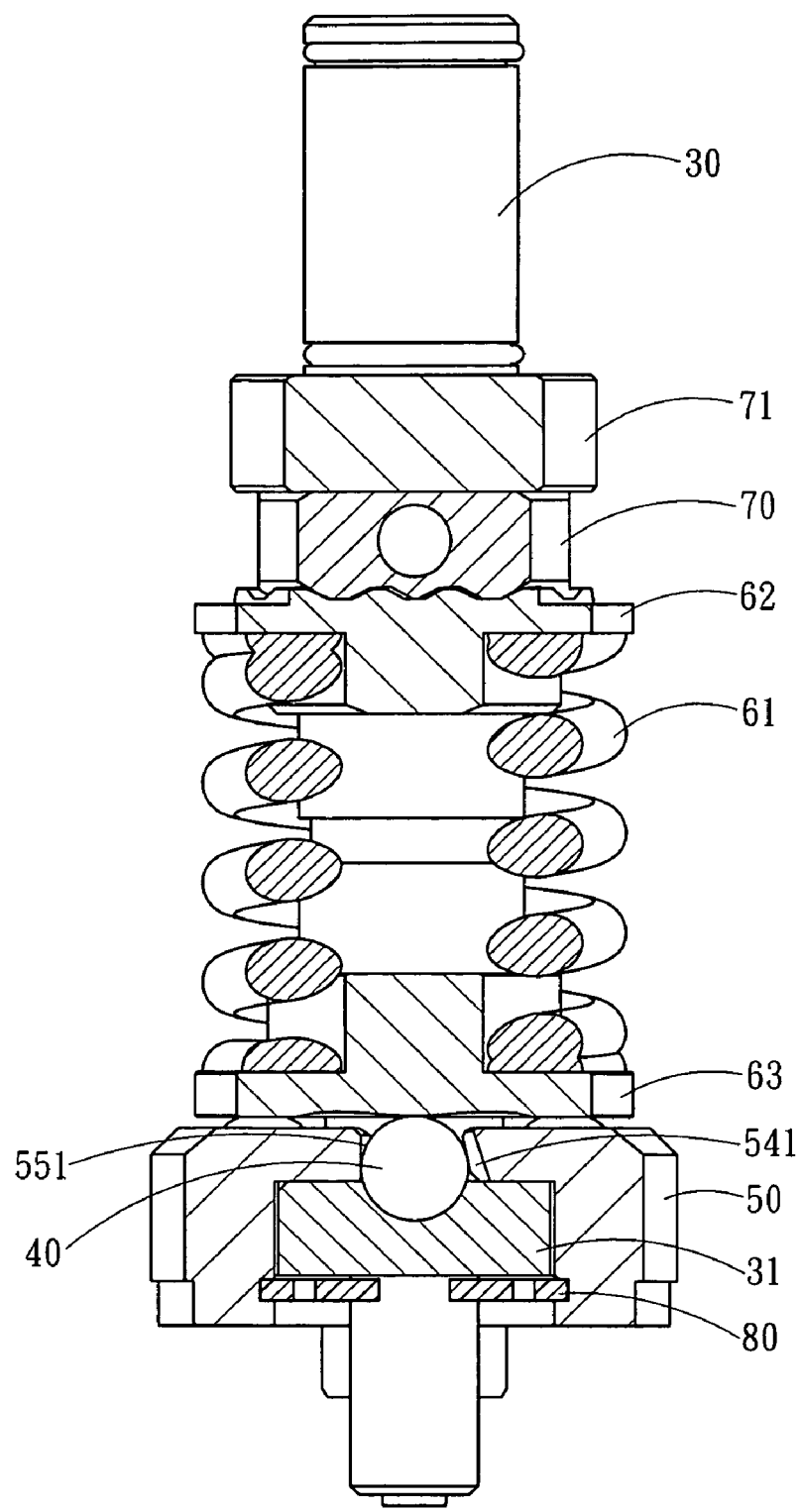
FIG. 4B is a cross-sectional view showing a clockwise movement of the present invention.
Figure 4C:
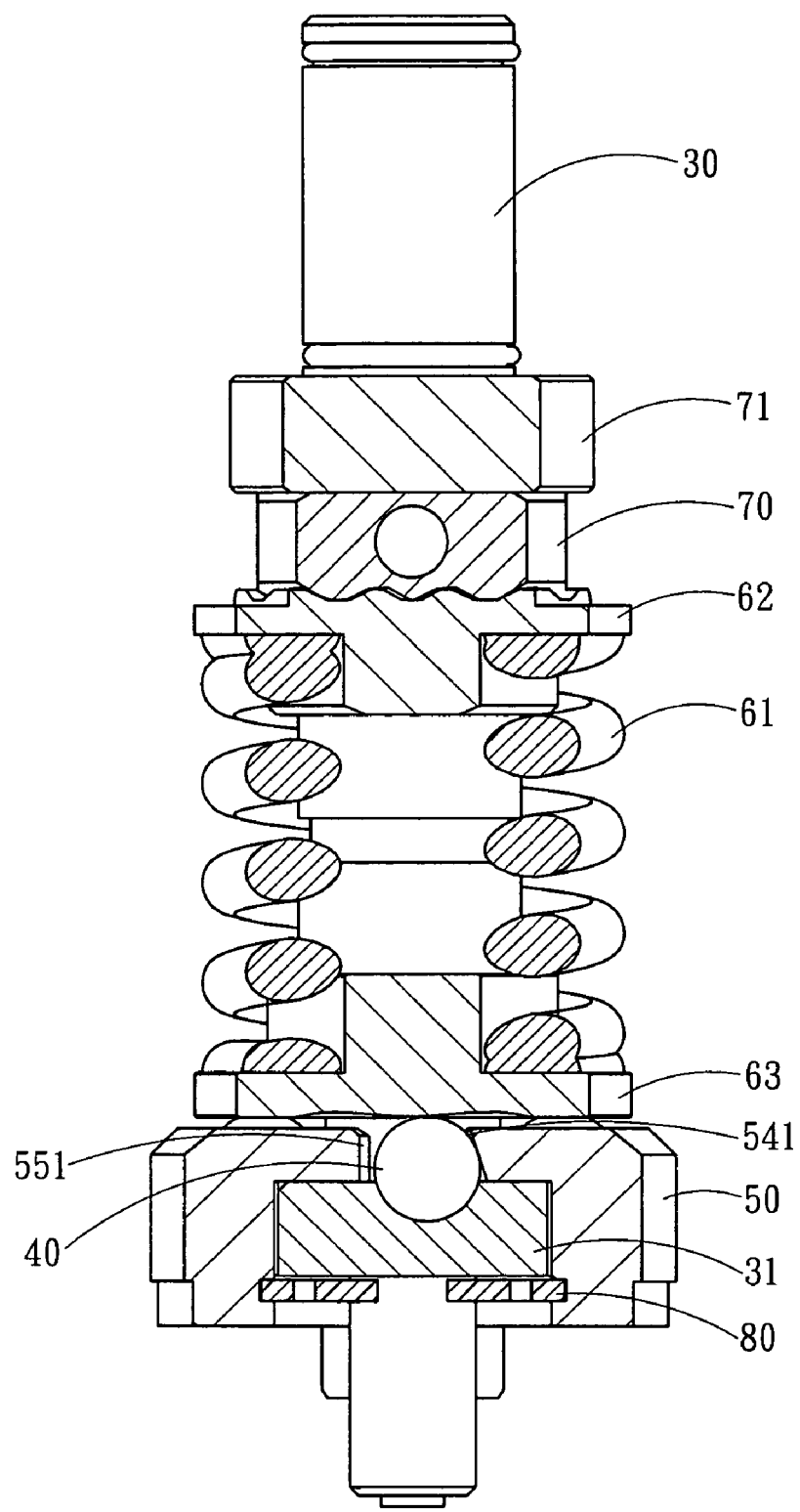
FIG. 4C is a cross-sectional view showing a counterclockwise movement of the present invention.

Referring to FIGS. 2 and 3 for the perspective view and the exploded view of the present invention respectively, the pneumatic screwdriver having an adjustable clockwise torque and a maximum counterclockwise torque of the invention comprises a body 20 coupled to a bushing 26 and having a trigger 24 and a handle 25, an air inlet portion 23 disposed at the bottom of the handle 25 for inputting a pressurized gas to provide a motive power source, and the body 20 installs a pneumatic motor (not shown in the figure). The pneumatic motor includes a power axle 21 for outputting the motive power, and the power axle 21 includes two rotating members 22 disposed at its end portions and linked to the power axle 21, and the rotating members 22 drives a transmission seat 50, and the transmission seat 50 corresponds to the rotating member 22 and having a protruding portion 53 for linking the rotating member 22, and the transmission seat 50 has a through hole 51, and the through hole 51 at its periphery has four steel ball holes 52. The present invention further comprises a clockwise rotating area 55 and a counterclockwise rotating area 54 at the steel ball hole 52 (as shown in FIGS. 4A and 4B). The sidewall of the clockwise rotating area 55 includes a vertical first leaning portion 551, and the sidewall of the counterclockwise rotating area 54 includes a second leaning portion 541 having an inclination with respect to the first leaning portion 551. A cam rod 30 is passed through the through hole 51, and a resilient device 60 is disposed on the cam rod 30 for pressing the transmission seat 50. The resilient device 60 includes a resilient element 61 (and the resilient element 61 could be a torque spring), a bottom base 63 coupled to an end of the resilient element 61 and normally pressing the transmission seat 50, and a cover 62 coupled to another end of the resilient element 61. The cover 62 is coupled to an adjusting nut 70 for adjusting the resilience of the resilient device 60. Users can use a wrench to turn the adjusting nut 70, so that the adjusting nut 70 produces a displacement at the cam rod 30 for adjusting the resilience of the resilient device 60, so as to adjust the torque when the pneumatic screwdriver is rotated clockwise. The cam rod 30 further installs a fixing ring 71 for preventing the rotation about its own axis and preventing the adjusting nut 70 from being separated completely from an appropriate position of the cam rod 30. An end of the cam rod 30 has a hexagonal hole 34 for connecting various disassembling tools (not shown in the figure) such as a screwdriver. Another end of the cam rod 30 has a steel ball seat 31 corresponding to the transmission seat 50. A C-shape ring 80 is installed between the internal wall of the transmission seat 50 and the steel ball seat 31, and the steel ball seat 31 includes an arc groove 32 thereon, and the arc groove 32 includes four steel ball grooves 33 corresponding to the steel ball holes 52, and each steel ball groove 33 installs a steel ball 40 and is coupled to the steel ball hole 52. By the resilient device 60 normally pressing the transmission seat 50 and the steel ball seat 31, the cam rod 30 and the transmission seat 50 form a transmitting relation through the steel ball 40. The steel ball 40 presses the first leaning portion 551 when the power axle 21 is rotated clockwise. Since the first leaning portion 551 does not have an inclination, therefore when a user turns the pneumatic screwdriver clockwise (to secure a screw), the torque makes the cam rod 30 to produce a reacting force. If the reacting force of the cam rod 30 is greater than the compressing strength of the resilient device 60, the steel ball 40 will push the resilient device 60 and will be separated from the steel ball groove 33 and shifted to an accommodating position of the steel ball groove 33 along the arc groove 32, so that the pneumatic screwdriver can achieve the predetermined torque, and the steel ball seat 31, transmission seat 50, and steel ball 40 can slide with each other. The pneumatic screwdriver outputs the predetermined torque and no longer applies a larger torque. Users also can adjust the compressing strength of the resilient device 60 to change the clockwise torque of the pneumatic screwdriver. When the power axle 21 is rotated counterclockwise, the steel ball 40 presses the second leaning portion 541, and the inclination of the second leaning portion 541 stops the steel ball 40 from being separated from the steel ball groove 33, and thus directly outputting a maximum torque when the pneumatic screwdriver is turned counterclockwise (as shown in FIG. 4C). The steel ball 40 presses the second leaning portion 541 when the pneumatic screwdriver is turned counterclockwise, and the second leaning portion 541 with an inclination stops the steel ball 40 from being separated from the steel ball groove 33.

In this preferred embodiment of the present invention, the pneumatic screwdriver having an adjustable clockwise torque and a maximum counterclockwise torque uses a vertical first leaning portion 551 to push the resilient device 60 to separate the steel ball 40 from the steel ball groove 33 easily, when the reacting force of the cam rod 30 being rotated clockwise is greater than the compressing strength of the resilient device 60, such that the steel ball seat 31, transmission seat 50, and steel ball 40 slide with each other. Further, the compressing strength of the resilient device 60 can be adjusted to change the torque when the pneumatic screwdriver is turned clockwise, and the second leaning portion 541 with an inclination makes the steel ball 40 unable to be separated from the steel ball groove 33, when the pneumatic screwdriver is turned counterclockwise, so as to directly output the maximum torque when the pneumatic screwdriver is turned counterclockwise. The present invention can effectively avoid the complicated process of adjusting the torque of the pneumatic screwdriver if users apply insufficient torque to loosen a screw. The invention also discloses a way of adjusting the clockwise torque and providing a maximum counterclockwise torque.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pneumatic screwdriver having an adjustable clockwise torque and a maximum counterclockwise torque, and said pneumatic screwdriver having a transmission seat linked thereon, and said transmission seat having a through hole and a cam rod passing through said through hole, and said cam rod at an end having a steel ball seat, and said steel ball seat and said transmission seat including at least one corresponding steel ball hole and a steel ball groove, and a steel ball being installed between said steel ball hole and said steel ball groove, and a resilient device passing through said cam rod tightly pressing said transmission seat and said steel ball seat, such that said cam rod and said transmission seat form a link relation, characterized in that:

said steel ball hole includes a clockwise rotating area and a counterclockwise rotating area, and a sidewall of said clockwise rotating area includes a first leaning portion for pressing said steel ball when said power axle is rotated clockwise, and said steel ball presses said resilient device to separate said steel ball from said steel ball groove, when the reacting force of said cam rod being rotated clockwise is greater than the compressing strength of said resilient device, said steel ball seat, said transmission seat, and said steel ball slide with each other, and a sidewall of said counterclockwise rotating area includes a second leaning portion for pressing said steel ball, when said power axle is rotated counterclockwise, and said second leaning portion includes an inclination with respect to said first leaning portion, and said inclination stops said steel ball from being separated from said steel ball groove.

2. The pneumatic screwdriver having an adjustable clockwise torque and a maximum counterclockwise torque of claim 1, wherein said pneumatic screwdriver includes a pneumatic motor therein and said pneumatic motor drives a power axle for providing an output motive force.

3. The pneumatic screwdriver having an adjustable clockwise torque and a maximum counterclockwise torque of claim 2, wherein said power axle at its end has at least one rotating member linked to said power axle.

4. The pneumatic screwdriver having an adjustable clockwise torque and a maximum counterclockwise torque of claim 3, wherein said transmission seat includes a protruding portion corresponding to said rotating member and driven by said rotating member.

5. The pneumatic screwdriver having an adjustable clockwise torque and a maximum counterclockwise torque of claim 1, wherein said steel ball hole is disposed at the periphery of said through hole.

6. The pneumatic screwdriver having an adjustable clockwise torque and a maximum counterclockwise torque of claim 1, further comprising a C-shape ring disposed between an internal wall of said transmission seat and said steel ball seat.

7. The pneumatic screwdriver having an adjustable clockwise torque and a maximum counterclockwise torque of claim 1, wherein said resilient device comprises a resilient element, a bottom base coupled to an end of said resilient element, and a cover coupled to another end of said resilient element.

8. The pneumatic screwdriver having an adjustable clockwise torque and a maximum counterclockwise torque of claim 7, wherein said resilient element is a torque spring.

9. The pneumatic screwdriver having an adjustable clockwise torque and a maximum counterclockwise torque of claim 7, wherein said bottom base normally presses said transmission seat by said resilient element.

10. The pneumatic screwdriver having an adjustable clockwise torque and a maximum counterclockwise torque of claim 7, wherein said cam rod has an adjusting nut coupled to said cover for adjusting a resilience of said resilient device.

* * * * *